Nov. 13, 1956  M. MORROW  2,770,687
STANDING AND DIRECTIVE FLOOD LIGHTING SYSTEM FOR VEHICLES
Filed Nov. 29, 1952  2 Sheets-Sheet 1
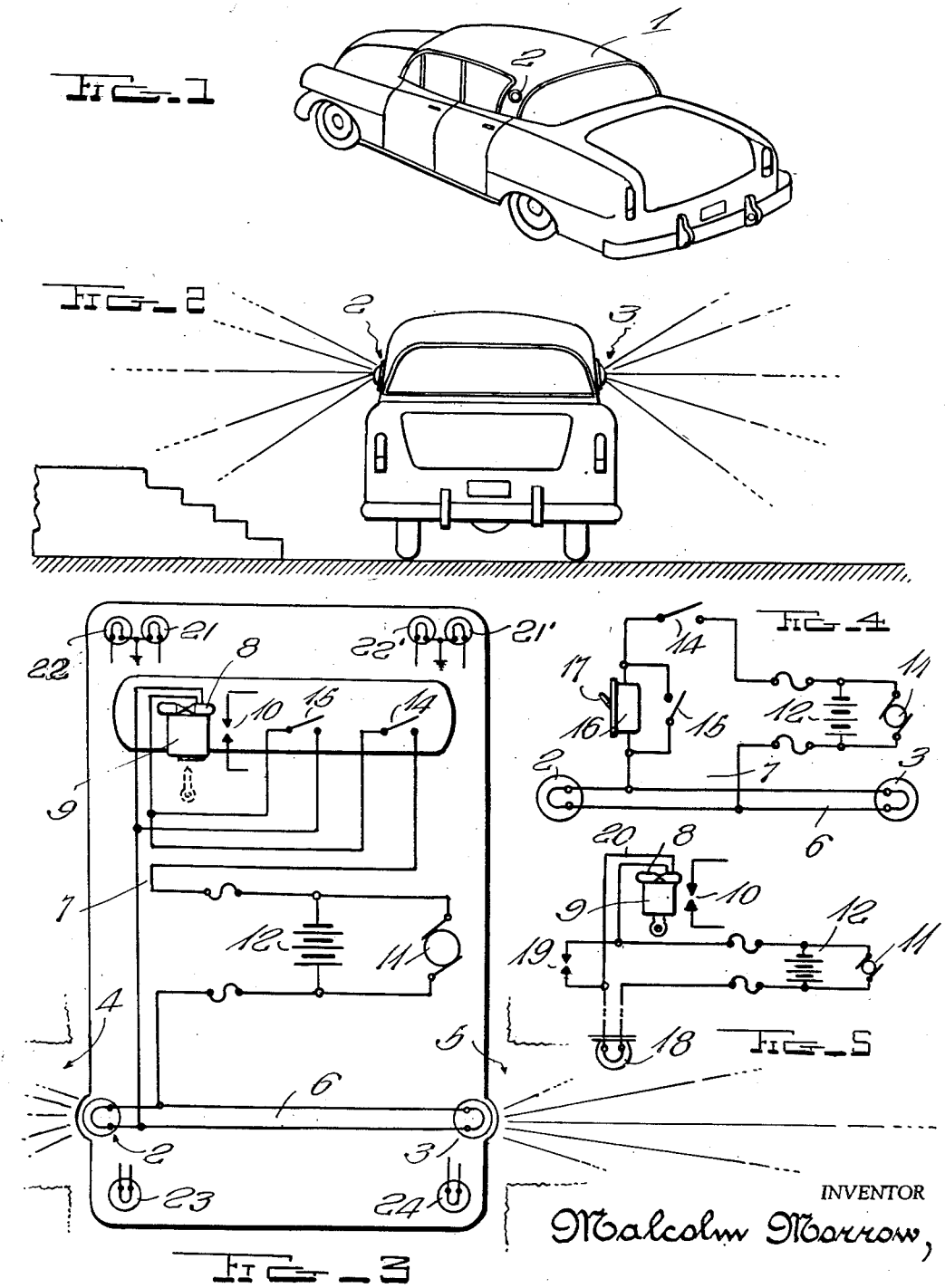
INVENTOR
Malcolm Morrow,
BY
John B. Brady
ATTORNEY

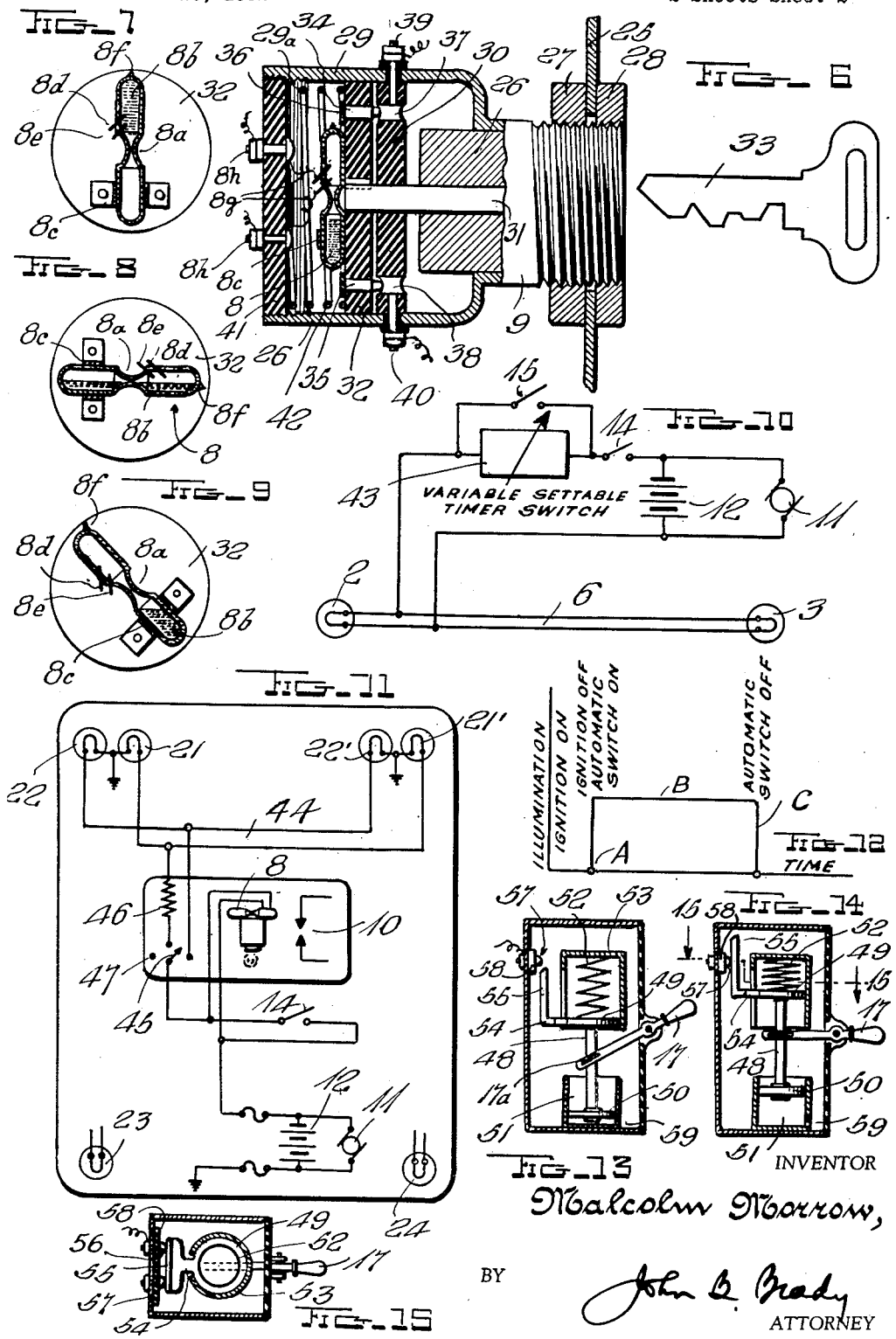

United States Patent Office 2,770,687
Patented Nov. 13, 1956

2,770,687

STANDING AND DIRECTIVE FLOOD LIGHTING SYSTEM FOR VEHICLES

Malcolm Morrow, Annandale, Va.

Application November 29, 1952, Serial No. 323,218

4 Claims. (Cl. 200—33)

My invention relates broadly to vehicles and more particularly to a standing and directive flood lighting system for installation on mobile units.

One of the objects of my invention is to provide a circuit arrangement for vehicle illumination in which the time period of illumination is manually or automatically controllable for cutting off the illumination on the vehicle after a predetermined time interval.

Another object of my invention is to provide a standing and directive flood lighting system for vehicles in which flood lights on the vehicle may be automatically cut off after a predetermined time period of illumination.

Still another object of my invention is to provide an automatic control device for vehicles which may be readily applied to existing sources of illumination on the vehicle, such as the head and rear light system or the back-up light system, for automatically cutting off said system after a predetermined time interval after the initial illumination thereof.

Still another object of my invention is to provide a circuit arrangement for vehicles, including an assembly of several switches with selected fixed time interval operating characteristics by which illumination on the vehicle may be controlled over predetermined time intervals after the initial illumination thereof, for enabling the illumination on the vehicle to be cut off automatically after the vehicle has been vacated.

Still another object of my invention is to provide a vehicle lighting control circuit associated with the ignition switch of the vehicle, whereby movement of the ignition switch automatically closes the vehicle lighting control circuit for establishing illumination which continues for a predetermined time interval and is then automatically interrupted without requiring the attention of the vehicle operator.

Other and further objects of my invention reside in the structural arrangement of time-delay switching system for vehicles, as set forth in the specification hereinafter following, by reference to the accompanying drawings, in which:

Figure 1 is a perspective view showing the standing and directive flood lighting system of my invention installed on an automobile; Fig. 2 is a rear view of the automobile of Fig. 1 illustrating the standing and directive flood lighting system installed thereon; Fig. 3 is a schematic view of the control circuit arrangement of my invention associated with the ignition lock of the automobile; Fig. 4 is a circuit arrangement of a modified form of my invention in which the standing and directive flood lighting system is controlled by a time-delay switch independently of the ignition lock; Fig. 5 is a schematic view of a further modified arrangement of my invention utilizing the conventional back-up light of the automobile as the standing and directive flood lighting illumination means under control of a time-delay switch controlled by the ignition lock; Fig. 6 is a vertical sectional view taken through the combined ignition lock and time-delay switch used in the standing and directive flood lighting system of my invention; Fig. 7 is a schematic elevational view showing the time-delay switch which is associated with the ignition lock and the position of the switch when the ignition lock is initially moved to off position; Fig. 8 is a schematic view similar to Fig. 7 illustrating the position of the time-delay switch when the ignition lock is moved to on position and the standing and directive flood lighting system of my invention decontrolled; Fig. 9 is a view similar to the views shown in Figs. 7 and 8 and illustrating the time-delay switch moved to an intermediate position of the ignition lock sufficient for operating the time-delay switch without cut off of the ignition circuit; Fig. 10 shows the application of the circuit of my invention to a system which includes a variable settable timer for predetermining the time period over which illumination may be maintained on the vehicle; Fig. 11 schematically shows the application of the system of my invention to the main headlight and tail-light circuits of the automobile; Fig. 12 is a theoretical diagram illustrating the manner in which illumination on the vehicle is automatically controlled over a predetermined time interval in the system of my invention; Fig. 13 is a schematic view showing the internal construction of the type of time-delay switch illustrated in circuit arrangement of Fig. 4, the view showing the time delay switch in its circuit open position prior to the actuation thereof; Fig. 14 is a view similar to the view shown in Fig. 13, but illustrating the time-delay switch after it has been moved to starting position and while it is moving under spring control to a circuit open position; and Fig. 15 is a transverse sectional view taken substantially on line 15—15 of Fig. 14.

My invention is directed to a standing and directive flood lighting system for a vehicle for aiding the occupants of the vehicle under conditions of darkness by lighting the walking path from the vehicle. I provide means on the vehicle for automatically deenergizing the flood lighting system after a predetermined time period after the flood lighting system has served its purpose in aiding the vehicle occupants to see the walking path from the vehicle. In accordance with my invention, a manual device is provided for conditioning the flood lighting system which initiates in operation an automatic cut-off device which functions after a pre-determined time interval to de-energize the flood lighting system automatically. Thus the vehicle occupants may vacate the vehicle with the flood lighting system illuminated and utilize the illumination thus provided for safely following a designated path with perfect confidence that after a given time interval the flood lighting system will be automatically extinguished without further attention. Thus drain on the storage battery system and waste of the non-useful illumination is eliminated. The flood lighting system may take a variety of forms such as an independent circuit on the vehicle terminating in flood lights at opposite sides of the vehicle and connected through the manual and automatic circuit control devices to the power supply system. Provision is made for initiating the luminous condition of the flood lights for operation over a predetermined time period which may be variably settable at will. I also provide means for interrupting the operation of the variable settable device so that the flood lighting system may be cut off manually without awaiting the functioning of the automatic means. The flood lighting system may utilize the conventional headlights of the vehicle in lieu of a separate flood light circuit and the automatic means employed for cutting off the headlights after the lapse of a given time interval after the vehicle has been brought to a stop and the vehicle vacated by the occupants. In lieu of the separate flood light circuit, or the conventional headlight circuit, I may employ the conventional back-up light as the flood light illumination means with the automatic time-controlled cut-off means interposed in the back-up light circuit so that after a predetermined time period after the vehicle has been brought to rest and has been vacated by the occupants the back-up light initiated in operation as a flood light is automatically extinguished after having performed its function as a convenient source of illumination in defining a proper walking path for the vehicle occupants.

In order to render the system of my invention as convenient as possible, I provide, in one of the embodiments of my invention, an automatic circuit timer associated with the ignition lock and power circuit control switch for the vehicle. The ignition lock is normally orientatable to two or more angular positions for conditioning the on-and-off power switch of the vehicle. The automatic electric circuit timer of my invention is controlled in accordance with the angular disposition of the ignition lock. The automatic electric circuit timer is wholly open when the ignition lock is in a position in which the power switch for the vehicle circuits is closed. That is to say, while the vehicle is operating, there may be little occasion to utilize the flood lighting circuit of my invention, although I provide for such use by a parallel connected switch disposed in parallel with the automatic cut-off switch and a series connected switch in the flood light control circuit, said latter switches being conveniently operable manually from the instrument panel. The automatic cut-off switch and timer is initiated in operation after the ignition lock is oriented to a position conditioning the automatic cut-off switch and timer. My invention will be more fully understood by detailed reference to the drawings hereinafter following, in which reference character 1 designates an automobile equipped with the standing and directive flood lighting system of my invention which includes the flood lights 2 and 3 mounted at such height on the vehicle as to provide adequate distribution of light laterally of the automobile for lighting the walking path from the vehicle designated at 4 and 5 at each side thereof. The flood lighting system illustrated in Figs. 1–10 is wholly independent of the conventional headlight illumination system for the vehicle and comprises, as indicated in Fig. 3, for example, the lateral circuit 6 connecting the flood lights 2 and 3 in parallel. The lateral circuit 6 is energized through circuit connections 7 leading to the automatic timing switch designated generally at 8 associated with the vehicle power circuit control and lock designated generally at 9 and including the power circuit contacts 10 which control the power circuits of the vehicle. The circuit connection 7 extending between the directive flood lighting system 2—6—3 and the vehicle power supply circuit constituted by generator 11 and storage battery 12 also includes the series connected manually controlled switch 14 and the parallel connected switch 15 connected in parallel with the contacts of the automatic switch and timer 8. Thus the automatic circuit control means at 8 may be de-conditioned by the closing of switch 15 and the flood light circuit manually controlled through series connected switch 14 or the flood light control circuit may be fully automatically controlled by operation of the automatic circuit timer 8.

In lieu of the arrangement of the automatic circuit timer 8, as herein explained, I may employ the arrangement illustrated in Fig. 4 in which a manually operated tumbler type switch 16 is mounted in the vehicle in a position convenient to the operator so that, when the operator is ready to vacate the vehicle, the tumbler arm 17 is manually grasped and moved downwardly. This has the effect of storing energy in a spring-actuated bellows which is compressed to a circuit-closing position thereby establishing connection between the vehicle power supply circuit 11—12 and the circuit connections 7—6 energizing the flood lights 2 and 3 which continue illuminated until the bellows and associated components forming the automatic switch are moved to cut-off position after the lapse of a given time interval, thereby opening the circuit to the flood lights 2 and 3. Where it may be desirable to reduce the time period during which the flood lights 2 and 3 are energized, series connected manual switch 14 is opened; or where it is desired to eliminate automatic control, parallel connected switch 15 is closed.

In Fig. 5 I have shown the manner in which the back-up light 18 is utilized as a flood light. In this arrangement, back-up light 18 is normally energized from the power supply circuit 11—12 through contacts 19 which are moved to closed position when the gear shift of the automobile is moved to reverse for illuminating back-up light 18 which serves as a warning. However, when the vehicle is at rest, back-up light 18 performs no useful function and is accordingly utilized in the system of my invention as a flood light by means of the parallel circuit connections designated at 20 electrically connected in parallel with the back-up light 18. In this arrangement, orientation of the power circuit control and lock 9 initiates in operation the electric circuit timer 8 which closes the circuit connections from the power supply system 11—12 to the back-up light 18 which is maintained in operation until the automatic timer 8 cuts off the circuit between the power supply system 11—12 and the back-up light 18. The power supply circuit contacts 10 to the vehicle, controlled by the power circuit control and lock 9, are wholly independent of the circuit 20 from timer 8. Also the headlights 21 and 22 and the rear lights 23 and 24 are independent of the flood lights 2 and 3 in the arrangement illustrated in Figures 1–5 and Fig. 10.

In Figs. 6–9 I have illustrated one of the embodiments of the electric circuit timer employed in the system of my invention. In this arrangement, the ignition lock is represented at 9 housed within a barrel structure shown at 26 which extends through the instrument panel illustrated at 25 and is secured thereto by means of fastening nuts 27 and 28. The barrel 26 is enlarged throughout the rear portion of its length as shown at 29 to form a housing for the power circuit contacts designated at 10 in Figs. 3, 5 and 11 and also to provide a housing for an electric circuit timer 8 of my invention. The circuit contact mounting and the timer have been shown in section in Fig. 6 and include the panel of insulation material shown at 30 fixed transversely of the casing 29 and through which the orientatable shaft 31 extends from the lock designated at 9. The shaft 31 carries the disc of insulation material shown at 32 thereon which is orientatable in accordance with the movement of shaft 31 and which is revolvable when the proper key 33 is inserted in the lock 9 and in coaction with the tumbler thereof revolves the shaft 31. The disc 32 carried by shaft 31 supports the contact members 34 and 35 interconnected by an annular conductive member 36. The contacts 34 and 35 establish wiping electrical connection with contact elements 37 and 38 carried by panel 30 and connected through binding posts 39 and 40 electrically insulated from casing 29 for connection with the power circuits of the vehicle.

The disc 32 provides a support for the electrical circuit timer 8 which, in this embodiment of my invention, is illustrated as a time-delay mercury tube. The tube is closed at both ends and is provided with a constriction 8a intermediate the ends thereof for the slow passage of the mercury designated at 8b from one bulbular portion to the other, in accordance with the position of the tube. The tube is secured diametrically of the disc 32 by means of a small strap 8c which extends around one bulbular portion of the tube and is fastened to the disc 32. The tube 8 is filled with mercury in a sufficient amount for the mercury to seek a level somewhat below the constriction 8a, as illustrated in Fig. 6. The tube 8 is provided with a pair of contacts 8d and 8e sealed in the wall of the tube slightly above the constriction illustrated in Fig. 6 and exposed to the mercury within the tube during the time period that the mercury is gravitating from the upper bulbular portion to the lower bulbular portion of the tube, as represented in Fig. 6. Under these conditions, the tube 8 is sealed off as represented at 8f. The sealed-in contacts 8d and 8e are connected through flexible leads shown at 8g to binding posts 8h carried by the rear panel 41 of insulation material. Panel 41 is externally screw threaded and engages the internal screw threads 29a interiorly of the casing 29. The panel 41, in addition to carrying the contact terminals for the electrical timer 8, also serves as an adjusting means in coaction with coil spring 42 for exerting uniform pressure against disc 32 for urging disc 32 toward the panel 30. Inasmuch as disc 32 is keyed to shaft 31, the disc is free to move within limits in the direction of panel 30 under the tension of spring 42 insuring uniform angular movement of the disc 32 to the two or more positions thereof. The power circuits controlled by the ignition switch extend through binding posts 39 and 40. The timing circuit to the standing and directive flood lighting system connects through binding posts 8h and 8h'.

Figs. 7, 8 and 9 illustrate the different angular positions to which disc 32 may be moved under control of the power circuit control and lock. In Fig. 7 the disc 32 is shown in a position in which the timer 8 has been oriented to a vertical position, and the mercury 8b commences to gravitate through the constriction 8a from the upper bulbular portion to the lower bulbular portion while maintaining the circuit through contacts 8d and 8e closed. The circuit through the contacts 8e and 8d remain closed so long as a sufficient portion of the mercury remains in the upper bulbular portion to bridge the contacts 8d and 8e. After the loss of the mercury from the upper bulbular portion to the lower bulbular portion of tube 8 through constriction 8a has reduced the level of mercury below contact 8d, the electrical circuit through the timer is opened.

When the power circuit control and lock is moved to a position closing the power circuit at 10; that is, the contacts 34 and 35 making connection with contact elements 37 and 38, the standing and directive flood lighting system has the circuit thereof open due to the condition illustrated, for example, in Fig. 8 where tube 8 is moved to a substantially horizontal position and the mercury 8b is wholly out of contact with the contacts 8d and 8e, or this condition of open circuit through the standing and directive flood lighting system may exist when tube 8 is in the position illustrated in Fig. 9 with the sealed-in contacts 8d and 8e entirely uncovered from the mercury 8b. However, upon orientation of the power circuit control and lock 9 to the position illustrated in Fig. 7, the circuit to the standing and directive flood lighting system is closed and remains in this condition until the mercury has passed below the level of contact 8d, as heretofore explained.

The application of the mercury switch device to the ignition lock, as illustrated herein, is but one example of how my invention may be carried out, and it is to be understood that the orientation of shaft 31 may be employed to function other types of time-delay switches such as the bellows type explained in connection with arrangement of Fig. 4; and numerous types of link- and spring-controlled and electric-relay-controlled time-delay contactors which may be initiated in operation by orientation of the ignition lock or power switch.

Fig. 10 shows another example of how my invention may be carried out and wherein the variable settable timer switch 43 is interposed in the circuit connections between the power supply circuit 11—12 and the standing and directive flood lighting system shown at 2—6—3. In this arrangement, I may utilize a mechanically wound spring-actuated contactor or an assembly of several switches with selected time periods for operation and which may be set by the operator of the vehicle so that illumination may be controlled for a predetermined selected time period. The variable settable timer switch 43 may be an electrically driven device employing a solenoid or motor as the driving element for predetermining the operation of the contactor over the desired time interval. In applying the variable settable timer switch 43 to the system of my invention, I may provide the same safeguards as provided in connection with the forms of my invention previously described, that is, the parallel connected switch 15 and entirely de-conditioning the effect of the variable settable timer switch 43 or the series connected switch 14 for entirely opening the circuit through the variable settable timer switch 43 for deactivating the standing and directive flood lighting system 2—6—3 immediately and without awaiting the operation of the time period of operation which would otherwise run for the limit to which the variable settable timer switch 43 may have been set.

In Fig. 11 I have shown the application of the system of my invention to the conventional headlight circuit 21—22 of the vehicle, wherein the automatic switch 8 is electrically connected in series with the power supply system 11—12 and the headlight circuit 44 of the vehicle. The headlight circuit has been illustrated as including the "On" and "Off" selector switch 45 which may connect either the bright lights 22 and 22' or the low lights 21 and 21' through dropping resistor 46 with the power supply system 11—12, or both. When selector switch 45 is moved to contact position 47 the headlight circuit and the use thereof as the standing and directive flood light system is discontinued. Moreover, the time period over which the headlight system might be normally used as the standing and directive flood lighting system may be shortened by moving switch 45 to the contacting position 47. Where it may be desirable to eliminate the time control entirely from the standing and directive flood lighting system, the parallel connected switch 14 is closed thereby shunting out the time-delay switch 8.

In Fig. 12 I have shown diagrammatically the manner in which illumination of the standing and directive flood lighting system is controlled according to time. The illumination has been indicated by ordinates and time has been plotted as abscissa. With ignition on throughout the time period to position A, there is no illumination of the standing and directive flood lighting system. However, at position A, the ignition switch is rotated and the automatic switch turned on, thereby causing the energization of the standing and directive flood lighting system at the level B. This condition continues until the automatic switch cuts off at position C, whereupon the standing and directive flood lighting system is de-energized.

The automatic switching means, as heretofore pointed out, may take a variety of forms, and in Figs. 13–15 I have indicated one of the arrangements which may be employed in carrying out the invention. In this arrangement, the tumbler arm 17 of the switch is movable from the position illustrated in Fig. 13 to the position shown in Fig. 14. The arm 17 is connected through the lost motion connection 17a with the plunger 48 which carries a spring-actuated head 49 on one end thereof and a piston on the other end thereof. The piston 50 operates in the dashpot cylinder 51 while the spring-actuated head 49 is actuated by coil spring 52, tending to continuously move tumbler arm 17 to the position shown in Fig. 13. The head 49 operates under control of coil spring 52 within the guide provided by cylinder 53. The cylinder 53 is linearly slotted at one side thereof for the passage of arm 54 which carries the linearly extending contact member 55 which moves in a path for establishing electrical connection with the contacts 56 and 57 mounted on the panel 58 of insulation material. When the tumbler arm 17 is moved to the position shown in Fig. 14, the contacts 56 and 57 are bridged by contact member 55. Coil spring 52 then expands and moves contact member 55 slowly along contacts 56 and 57 maintaining the electric circuit therethrough and assuring the continuance of the energization of the standing and directive flood lighting system as heretofore explained.

However, when the limit of movement of plunger 48 is reached by the air slowly leaking from dashpot cylinder 51 through the bleed port 59, the contact member 55 passes beyond the contacts 56 and 57 to the position illustrated in Fig. 13, whereupon the standing and directive flood lighting system is de-energized as heretofore explained. The contact member 55 is formed from resilient material biased towards contacts 56 and 57 so that a positive connection is maintained through the entire period of time control provided by the device.

The standing and directive flood lighting system of my invention is especially applicable for conditions where passengers, or the car operator, must alight in the dark in surroundings which are unknown to them and in which they are unable to be informed of a proper walking path; or conditions where it is necessary to change tires, make repairs, or apply chains, or conditions where it may be advisable to provide additional warning to moving traffic that a car is parked at the side of the road; and be assured that illumination is to be maintained only for a predetermined time period without unnecessary drain upon the car battery after the illumination is no longer essential. Although I have illustrated my invention as applied particularly to passenger vehicles, I desire that it be understood that my invention is to be applied generally to automobile units, including busses, streetcars, railway cars, and other forms of vehicles.

Various combinations of lights and circuits may be controlled on the vehicle so that several lights and all or parts of several circuits, either simultaneously or selectively, may be automatically controlled as a unitary standing and directive flood lighting system. For example, the back-up light circuit, illustrated in Fig. 5, may be so connected with the low headlights 21—21' and the sidelights, either with or without auxiliary, series or parallel switches for each of these lights, so that all of them, or any selected combination of them, can be automatically controlled by the system of my invention, utilizing, for example, the variable settable timer switch 43 represented in Fig. 10 for this purpose.

With respect to the variable settable timer switch 43 shown in Fig. 10, this switch is capable of operation at selected time intervals for continuing the illumination, for example, for a 15-minute time interval before the illumination is cut off automatically. I may also so arrange the variable settable timer switch 43 so that, after the illumination has been cut off, such de-energization may continue for a projected time interval and then the circuit automatically again energized for cutting on the illumination. This is particularly desirable in situations where the passenger car, for example, is vacated at a given time and the illumination cut off automatically at a projected time interval thereafter with provision for restoring the illumination at a time that it is known that the car occupants will return to the car, thereby saving the storage battery for a projected time interval, at the same time providing for the convenience of the car passengers when the car is to be re-occupied.

As heretofore pointed out, a variety of forms of circuit closing devices may be employed, and I desire that the embodiments herein shall be considered in the illustrative sense and not in the limiting sense. For example, a vehicle door controlled plunger switch may be utilized as part of the cotnrol system of my invention and the time-delay cycle may be initiated automatically upon the opening and closing of the door as the operator vacates the vehicle. Under these circumstances the illumination cycle will continue until the time-delay mechanism of the vehicle door controlled plunger switch extends its operating cycle.

I realize that other modifications in the system of my invention may be made, and I desire that it be understood that no limitations upon my invention are intended except as may be imposed by the scope of the appended claims.

What I claim as new and desire to secure by Letters Patent of the United States is as follows:

1. An electrical control switch comprising a rotatable member, a lock for controlling the orientation of said rotatable member, a disc of insulation material carried by said rotatable member, a tubular vessel extending diametrically of said disc, said vessel having a bulbular portion on each end thereof and a constricted passage intermediate the ends thereof, a pair of spaced contacts sealed within the wall of said tubular vessel and a quantity of mercury in said vessel operative to gravitate from one bulbular portion to the other under control of said constriction for predetermining the time period that said spaced contacts are bridged by the mercury and the electrical circuit leading thereto correspondingly closed, and in which said disc of insulation material is longitudinally displaceable on said rotatable member and which includes a cylindrical housing surrounding said lock and extending rearwardly thereof and internally screw threaded at the end thereof, an adjustable end member of insulation material externally screw threaded to engage the internal screw threads in said housing, a coil spring interposed between the inside wall of said end member and said disc of insulation material carried by said rotatable member, a panel member interposed between said lock and said disc of insulation material, electrical contacts mounted on said panel member and coacting switching contacts carried by said disc whereby the switching contacts on said disc are yieldably urged by said coil spring to a position for making or breaking electrical connections between said contacts.

2. An electrical control switch comprising a rotatable member, a lock for controlling the orientation of said rotatable member, a disc of insulation material carried by said rotatable member, a tubular vessel extending diametrically of said disc, said vessel having a bulbular portion on each end thereof and a constricted passage intermediate the ends thereof, a pair of spaced contacts sealed within the wall of said tubular vessel and a quantity of mercury in said vessel operative to gravitate from one bulbular portion to the other under control of said constriction for predetermining the time period that said spaced contacts are bridged by the mercury and the electrical circuit leading thereto correspondingly closed, and which includes a housing surrounding said lock and extending rearwardly therefrom and internally screw threaded at the end thereof, an end plate of insulation material externally screw threaded to engage the internal screw threads in said housing and terminal posts carried by said end plate and electrically connected with the spaced contacts sealed within the wall of said tubular vessel, said end plate being readily removable from the rear of said housing for permitting access to said tubular vessel.

3. An electrical control switch comprising a cylindrical housing, a lock-operated angularly rotatable shaft extending axially into said housing and spaced from the side walls thereof, a panel of insulation material forming a fixed barrier intermediate the length of said housing, circuit terminals carried by said barrier and extending beyond said housing in insulated relation thereto, contacts located in the rear face of said barrier and connected with said circuit terminals, a revolvable disc of insulation material carried by said shaft, bridging circuit members carried by said disc and operative to form a circuit connection between the contacts on the rear face of said barrier when said circuit members are aligned in circuit connection with said contacts on the rear face of said barrier, and a gravity operated mercury time switch mounted on said disc and initiated in timing operation for effecting a circuit interruption condition simultaneously with the movement of said disc to a position to establish circuit connections between said circuit members thereon and said contacts on the rear face of said barrier, and in which said housing projects longitudinally beyond said disc and the mercury time switch thereon and is provided with screw threads on the terminating end thereof, a panel closing the end of said housing and adjustably engaging the screw threaded terminus thereof, and a coil spring interposed between said panel and the periphery portion of said disc for exerting a yielding force upon said disc for urging the circuit members on said disc into electrical connection with the contacts on the rear of said barrier.

4. An electrical control switch comprising a cylindrical housing, a lock-operated angularly rotatable shaft extending axially into said housing and spaced from the side walls thereof, a panel of insulation material forming a fixed barrier intermediate the length of said housing, circuit terminals carried by said barrier and extending beyond said housing in insulated relation thereto, contacts located in the rear face of said barrier and connected with said circuit terminals, a revolvable disc of insulation material carried by said shaft, bridging circuit members carried by said disc and operative to form a circuit connection between the contacts on the rear face of said barrier when said circuit members are aligned in circuit connection with said contacts on the rear face of said barrier, and a gravity operated mercury time switch mounted on said disc and initiated in timing operation for effecting a circuit interruption condition simultaneously with the movement of said disc to a position to establish circuit connections between said circuit members thereon and said contacts on the rear face of said barrier, and in which said housing projects longitudinally beyond said disc and the mercury time switch thereon and is provided with internal screw threads on the terminating end thereof, a circular panel of insulation material externally screw threaded on the periphery thereof to adjustably engage the internal screw threads in said housing, and yieldable means surrounding said mercury time switch and interposed between the face of said circular panel and the peripheral portion of said disc for exerting a yielding force upon said disc for urging the circuit members thereon into electrical connection with the contacts on the rear of said barrier.

References Cited in the file of this patent

UNITED STATES PATENTS

| | | |
|---|---|---|
| 923,129 | Schweitzer et al. | May 25, 1909 |
| 1,657,816 | Bonner | Jan. 31, 1928 |
| 1,676,977 | Blair | July 10, 1928 |
| 1,774,101 | Lorimer | Aug. 26, 1930 |
| 1,784,930 | George | Dec. 16, 1930 |
| 1,931,967 | Steiner | Oct. 24, 1933 |
| 2,013,044 | Friis | Sept. 3, 1935 |
| 2,062,440 | Beal | Dec. 1, 1936 |
| 2,201,754 | Worth | May 21, 1940 |
| 2,258,846 | Courtney | Oct. 14, 1941 |
| 2,437,037 | Nelson et al. | Mar. 2, 1948 |
| 2,481,225 | Kaye | Sept. 6, 1949 |
| 2,637,801 | Kelley et al. | May 5, 1953 |